United States Patent
Bareau et al.

(10) Patent No.: US 7,477,461 B2
(45) Date of Patent: Jan. 13, 2009

(54) THREE-ELEMENT PHOTOGRAPHIC OBJECTIVE WITH REDUCED TOLERANCE SENSITIVITIES

(75) Inventors: Jane Bareau, Needham, MA (US); Peter P. Clark, Boxborough, MA (US)

(73) Assignee: Flextronics AP, LLC, Broomfield, CO (US)

( * ) Notice: Subject to any disclaimer, the term of this patent is extended or adjusted under 35 U.S.C. 154(b) by 58 days.

(21) Appl. No.: 11/644,459

(22) Filed: Dec. 22, 2006

(65) Prior Publication Data

US 2008/0165430 A1    Jul. 10, 2008

(51) Int. Cl.
*G02B 9/14* (2006.01)
*G02B 9/12* (2006.01)
*G02B 3/02* (2006.01)

(52) U.S. Cl. .................. 359/785; 359/716; 359/784
(58) Field of Classification Search ......... 359/716, 359/784, 785, 789, 791, 792; 348/335
See application file for complete search history.

(56) References Cited

U.S. PATENT DOCUMENTS

| | | | | |
|---|---|---|---|---|
| 2,279,372 | A | 4/1942 | Herzberger | 88/57 |
| 3,087,384 | A | 4/1963 | Baur et al. | 88/57 |
| 3,599,377 | A | 8/1971 | Dartnell | 51/284 |
| 5,016,993 | A | 5/1991 | Akitake | 350/429 |
| 5,095,204 | A | 3/1992 | Novini | 250/223 B |
| 5,177,638 | A | 1/1993 | Emura et al. | 359/704 |
| 5,196,963 | A | 3/1993 | Sato et al. | 359/699 |
| 5,272,567 | A | 12/1993 | Inoue | 359/696 |
| 5,754,210 | A | 5/1998 | Haneda et al. | 347/116 |
| 5,805,362 | A | 9/1998 | Hayes | 359/819 |
| 5,835,208 | A | 11/1998 | Hollmann et al. | 356/124 |
| 5,926,965 | A | 7/1999 | Shijo et al. | 33/390 |
| 6,091,902 | A | 7/2000 | Komatsuzaki et al. | 396/60 |
| 6,292,306 | B1 | 9/2001 | Betensky | 359/663 |
| 6,417,601 | B1 | 7/2002 | Kim | 310/333 |
| 6,597,516 | B2 | 7/2003 | Saitoh et al. | 359/694 |
| 6,762,888 | B1 | 7/2004 | Oshima | 359/696 |

(Continued)

FOREIGN PATENT DOCUMENTS

EP      1148406 A2    10/2001

(Continued)

OTHER PUBLICATIONS

"High Precision Optical Assembly Starts Here," (4 pages) 1996, Opto-Alignment Technology, Inc.

*Primary Examiner*—David N Spector
(74) *Attorney, Agent, or Firm*—Haverstock & Owens LLP

(57) ABSTRACT

The present invention is a compact lens system for use as a wide-field photographic objective with small format digital image sensors having a pixel dimension less than 0.010 mm. The f-number of the lens system is 2.9740, and the effective focal length of the system is 3.85 mm. The full angular field of view of the lens system is 61 degrees, and the chief ray incidence angles on the image plane are less than 18 degrees. The system comprises three plastic lenses, each having two aspheric surfaces. At least one of the aspheric surfaces in the system is coated with a multilayer infrared cut-off filter for blocking infrared wavelengths from the image sensors. The lens system has a reduced sensitivity to manufacturing tolerances, particularly lateral misalignment of optical elements and surfaces.

17 Claims, 5 Drawing Sheets

U.S. PATENT DOCUMENTS

| | | |
|---|---|---|
| 7,088,525 B2 | 8/2006 | Finizio et al. .............. 359/703 |
| 7,193,793 B2 * | 3/2007 | Murakami et al. .......... 359/791 |
| 7,301,712 B2 * | 11/2007 | Kamo ....................... 359/785 |
| 7,394,602 B2 * | 7/2008 | Chen et al. ................. 359/785 |
| 7,400,454 B2 * | 7/2008 | Kubota et al. .............. 359/689 |
| 7,420,609 B2 * | 9/2008 | Yamaguchi et al. ......... 348/335 |
| 2002/0018140 A1 | 2/2002 | Suemoto et al. ............ 348/358 |
| 2002/0102946 A1 | 8/2002 | SanGiovanni ............... 455/90 |
| 2003/0174419 A1 | 9/2003 | Kindler et al. .............. 359/819 |
| 2004/0203532 A1 | 10/2004 | Mizuta ..................... 455/90.3 |
| 2005/0264670 A1 * | 12/2005 | Yamaguchi et al. ......... 348/335 |
| 2006/0113867 A1 | 6/2006 | Sakatani et al. ........ 310/323.17 |
| 2006/0291061 A1 * | 12/2006 | Iyama et al. ................ 359/614 |

FOREIGN PATENT DOCUMENTS

| | | |
|---|---|---|
| EP | 1148406 A3 | 6/2002 |
| EP | 1357726 A1 | 10/2003 |
| GB | 1 378515 | 12/1974 |
| GB | 2315186 A | 1/1998 |
| GB | 2387063 A | 10/2003 |
| JP | 11-72678 | 3/1999 |
| JP | 2002-286987 | 10/2002 |

\* cited by examiner

THREE-ELEMENT PHOTOGRAPHIC OBJECTIVE WITH REDUCED TOLERANCE SENSITIVITIES

FIELD OF THE INVENTION

The present invention relates generally to wide-field photographic lens systems. More specifically, the present invention relates to a compact photographic lens system having reduced tolerance sensitivities to lateral misalignment of optical elements and surfaces.

BACKGROUND OF THE INVENTION

Traditional photographic objective designs, such as the Cooke triplet, typically have chief ray angles that are similar in magnitude to the field angle of the system. For example, U.S. Pat. No. 2,279,372 to Herzberger entitled, "Photographic Objective," and U.S. Pat. No. 3,087,384 to Baur et al. entitled, "Triplet Wide-Angle Objective Lens," both disclose Cooke-triplet type lens systems for photographic film applications. These prior art inventions both have relatively large chief ray angles because photographic film applications do not require reduced chief ray angles.

Today's photographic objectives may be used with small format digital image sensors whose resolution is typically between 640×480 pixels and 1280×960 pixels, where the pixels have dimensions less than 0.010 mm, as with cell phone camera applications. An imaging system for this type of application must have a full angular field of view between 50 and 70 degrees. In addition, the imaging system must meet size limitations, requiring chief ray incidence angles on the image plane to be limited to less than 20 degrees.

As digital imaging planes become smaller, the pixel count remains the same or even increases. A photographic objective lens may be developed for a new system by adapting a successful lens design for a 35 mm format by scaling the lens system according to the reduction in dimension of the image plane. For example, the diagonal of a 35 mm film frame is 43.3 mm, while the diagonal of a quarter-inch format has an image sensor diagonal of 5.6 mm. Thus, the lens system must be scaled down by 5.6/43.3 or approximately a factor of eight which means that the tolerance values must also be scaled down by the same amount in order to achieve the same image quality. This results in much tighter tolerance requirements for the scaled-down lens system, which are currently achievable in large scale manufacturing.

In the past, lens system assemblies designed as photographic objectives for small format image planes have had difficulty consistently meeting performance specifications due to the effects of manufacturing construction errors. Previous designs were too sensitive to alignment errors. Consequently, the sharpness of the image was reduced by an unacceptable amount when the strict centering requirements of the optical elements imposed by the design were not met.

The problem of achieving a reduced sensitivity to manufacturing tolerances in a wide-angle photographic objective lens system used with small format digital image sensors has not been adequately resolved.

SUMMARY OF THE INVENTION

A compact wide-field photographic objective lens system for use with small format digital image sensors is disclosed which is suitable for cell phone camera module applications.

The diagonal of the image sensor to be used with the present invention is only 4.56 mm. This digital photography imaging system requires an angular field of view between 50 and 70 degrees while simultaneously restricting the angle of the chief ray incident upon the image plane to less than 20 degrees.

The present invention has an angular field of view of 61 degrees, and the chief ray angle on the image plane is less than 18 degrees. The effective focal length of the system is 3.85 mm, and the f-number of the lens system is 2.97. The lens system has three lenses, each of which has two aspheric surfaces. All three lenses are made from a plastic material. The lens closest to the object and the lens closest to the image plane are made out of the same plastic material, and the lens in between these two lenses is made from a different plastic material. The index of refraction of the plastic material of the outermost lenses is less than the index of refraction of the middle lens over a range of visible wavelengths. At least one of the aspheric surfaces of the three lenses is also coated with a multilayer infrared cutoff filter to block infrared wavelengths from reaching the image sensors at the image focal plane.

This lens system design is less sensitive to manufacturing misalignment errors of the optical components than traditional photographic objectives. Thus, it is easier to consistently meet image sharpness requirements during the manufacturing process with the present invention.

DETAILED DESCRIPTION OF THE INVENTION

The present invention discloses a compact three-lens system for use as a wide-field photographic objective for capturing images of objects with small format digital image sensors. This lens form is most effectively used in camera systems with image sensor resolutions between 640×480 pixels and 1280×960 pixels, and pixel dimensions less than 0.010 mm.

The lens form is configured as a modified triplet including an aperture stop shifted towards the object plane. A first lens in the lens form functions as a field lens such that the overall track length of the system can be kept relatively short while the chief ray angles incident at the image plane can be constrained to an angle significantly less than that of the field of view. The first lens, while maintaining the positive power of the classic triplet, takes the form of a relatively thick positive meniscus. Likewise, a second lens includes a relatively thick negative meniscus and a third lens includes a relatively thick positive meniscus. In some embodiments, the aperture stop is positioned between the first lens and the second lens such that a concave surface of the first lens faces the aperture stop and a convex surface of the second lens faces the aperture stop. In such a configuration, a convex surface of the third lens is positioned closest to the aperture stop relative to a concave surface of the third lens. This basic configuration is further refined through the use of aspheres on the surfaces of each of the lens in the lens form to optimize the optical performance of the system, minimize the incident angle of chief rays at the image plane, and desensitize the system to the effects of tolerances while meeting short total track length requirements. The constraints of the system requirements result in a lens with aspheric elements that are far removed from a basic spherical shape.

Figure 1:
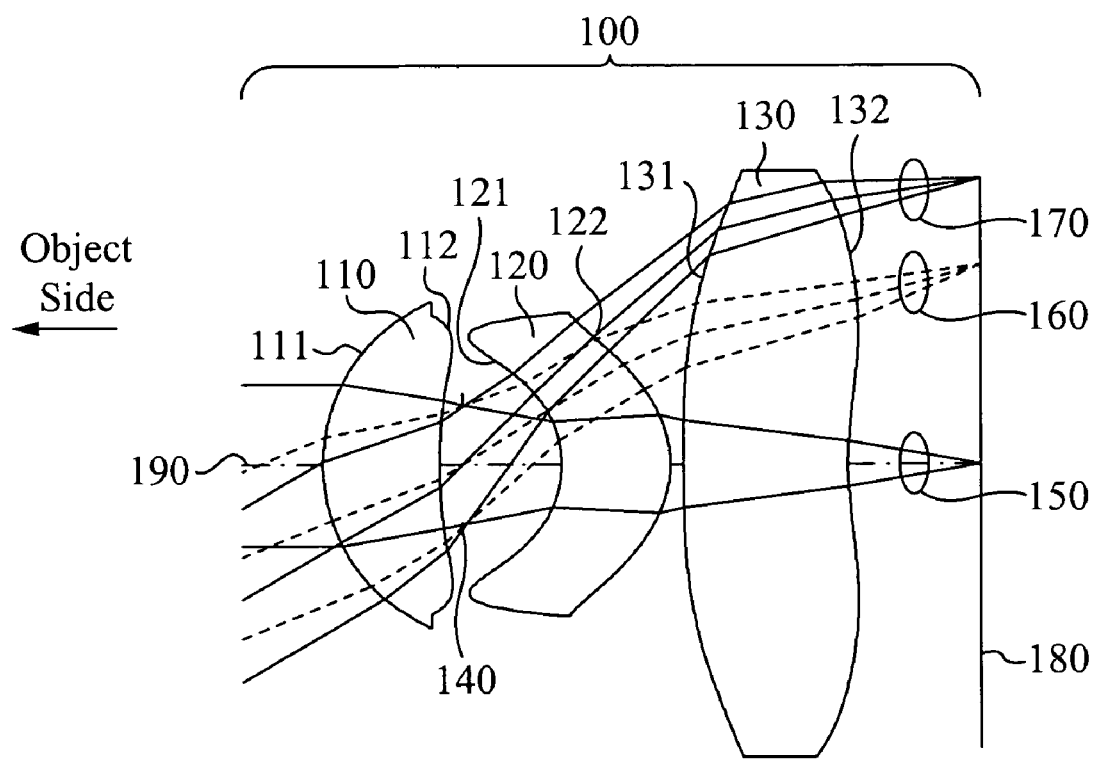
FIG. 1 is a diagram of a three-lens system according to a preferred embodiment of the present invention. Also shown are ray bundles propagating through the lens system at input angles of 0°, 21°, and 31°.

FIG. 1 shows a side view outline of the lens system 100 in accordance with the preferred embodiment of the present invention. For objects located at infinity, the image plane 180 is shown to the right of the third lens 130. The lens system 100 comprises three lenses 110, 120, and 130 and an aperture stop 140 to limit the amount of light that is transmitted through the system to the image plane 180. Along the optical axis 190 of the system, an air space gap separates the lenses from each other. The first lens 110 is closest to the object, which is not shown in the figure because it is located at infinity (as indicated by the parallel ray bundles propagating from the left side of FIG. 1), and the third lens 130 is closest to the image plane 180. To the right of the first lens 110 is the aperture stop 140, and to the right of the aperture stop 140 is the second lens 120. The first lens 110 has two aspheric surfaces, surface 111 on the left side of the first lens 110 and surface 112 on the right side of the first lens 110. The second lens 120 also has two aspheric surfaces, surface 121 on the left side of the second lens 120 and surface 122 on the right side of the second lens 120. The third lens 130 also has two aspheric surfaces, surface 131 on the left side of the third lens 130 and surface 132 on the right side of the third lens 130. The image plane 180 in the preferred embodiment of the present invention is an image sensor having 5.6 micron-wide pixels with a resolution of 640×480 pixels, where the total diagonal of the image plane sensors is 4.56 mm. However, the pixel width and the resolution of the image plane sensor may be larger or smaller.

All three of the lenses 110, 120, and 130 are centered along an optical axis 190 and are oriented perpendicularly to the optical axis 190. Bundles of rays 150, 160, and 170 have been traced through the system 100 to indicate the image of both on-axis and off-axis object points. The bundle of rays 150 correspond to light propagating through the system from an on-axis object point (0° angle); the bundle of rays 160, indicated by dotted lines, correspond to light propagating through the system from an off-axis object point (21° angle); and the bundle of rays 170 correspond to light propagating through the system from another off-axis object point (31° angle).

Each of the three lenses 110, 120, and 130 are made from a polymeric plastic material having a wavelength-dependent index of refraction. Preferably, the first lens 110 and the third lens 130 are made from the same crown-like polymeric plastic material, while the second lens 120 is made from a different flint-like polymeric plastic material. Alternatively, the three lenses 110, 120, and 130 are each made from a different polymeric plastic material.

At least one of the aspheric surfaces, 11, 112, 121, 122, 131, or 132, of the three lenses 110, 120, and 130 is coated with an infrared (IR) cut-off filter. Preferably the IR filter is a multilayer filter.

According to a preferred embodiment of the present invention, Table 1 presents data for the lens system 100 which includes the surface number starting from the leftmost surface 111 of the first lens 110 and sequentially listing surfaces through to the image plane 180, the radius of curvature R corresponding to that surface, and the axial distance D to the next surface. The indices of refraction for the three lenses 110, 120, and 130 are given in Table 2 below.

TABLE 1

| surface number | R (mm) | D (mm) |
| --- | --- | --- |
| 1 (aspheric surface 111) | 1.46147 | 0.926558 |
| 2 (aspheric surface 112) | 4.02562 | 0.186726 |
| 3 (aperture stop 140) | infinity | 0.783170 |
| 4 (aspheric surface 121) | −0.86883 | 0.862493 |
| 5 (aspheric surface 122) | −0.88906 | 0.100000 |
| 6 (aspheric surface 131) | 13.92620 | 1.305631 |
| 7 (aspheric surface 132) | 3.08958 | 1.042623 |
| 8 (image plane 180) | infinity | 0.000000 |

Table 2 lists the wavelength-dependent refractive indices at three characteristic wavelengths of the visible spectrum: λ=656.27 nm (hydrogen C-line), 587.56 nm (helium D-line), and 486.13 nm (hydrogen F-line) for the two plastics that are used in the preferred embodiment of the present invention. Plastic A is used for manufacturing the first lens 110 and the third lens 130, and plastic B is used for manufacturing the second lens 120.

TABLE 2

|  | 656.27 nm | 587.56 nm | 486.13 nm |
| --- | --- | --- | --- |
| Plastic A refr. index | 1.530464 | 1.533236 | 1.539958 |
| Plastic B refr. index | 1.584949 | 1.590481 | 1.604076 |

The f-number of the lens system 100 is 2.9740, and the effective focal length of the lens system 100 is 3.8514 mm. The total length of the manufactured system as measured from the point closest to the object to the image plane sensors for a system focused on an object at infinity is 5.3 mm.

All six surfaces 111, 112, 121, 122, 131, and 132 of the three lenses 110, 120, and 130 are aspheric surfaces. The surface sag, Z, of an aspheric surface is expressed by the following equation:

$$Z=\{[Cy^2]/[1+(1-(1+K)C^2y^2)^{1/2}]\}+A_4y^4+A_6y^6+A_8y^8+A_{10}y^{10},$$

where C is the curvature of the base sphere, K is the conic coefficient, $A_4, A_6, A_8,$ and $A_{10}$ are the aspheric coefficients of the $4^{th}, 6^{th}, 8^{th},$ and $10^{th}$ order aspheric deformations, respectively, and y is the distance of a point from the optical axis. Table 3 lists the constants associated with each of the six aspheric surfaces 111, 112, 121, 122, 131, and 132. In accordance with the preferred embodiment of the present invention, the first lens 110 is bi-aspheric, but retains the basic shape of a positive meniscus. The second lens 120 is bi-aspheric, but retains the basic shape of a negative meniscus. The third lens 130 is bi-aspheric and has the basic form of a positive meniscus. In the embodiment illustrated in FIG. 1, the surface 111 of the first lens 110 is convex, the surface 112 of the first lens is concave, the surface 121 of the second lens is concave, the surface 122 of the second lens is convex, the surface 131 of the third lens is convex, and the surface 132 of the third lens is a Schmidt-like concave surface. It is apparent to one skilled in the art that the constants associated with each of the six aspheric surfaces 111, 112, 121, 122, 131, and 132 listed in Table 3 may have slightly different values while maintaining the same basic form, and still meet the basic wide-angle photographic objective lens system requirements and still have reduced sensitivity to manufacturing tolerances.

TABLE 3

| surface # | C | K | $A_4$ | $A_6$ | $A_8$ | $A_{10}$ |
|---|---|---|---|---|---|---|
| 1 | 0.6842 | −0.217259 | 0.220491E−01 | −0.804327E−02 | 0.211727E−01 | −0.489200E−02 |
| 2 | 0.2484 | 0.000000 | 0.142213E−01 | 0.239180E−01 | −0.241970E−01 | −0.397346E−01 |
| 3 | −1.1510 | −1.389308 | −0.376487 | 0.158468 | −0.474164 | 0.477056 |
| 4 | −1.1248 | −0.856668 | −0.424689E−02 | 0.226153E−01 | −0.405796E−01 | 0.308115E−01 |
| 5 | 0.0718 | 4.348329 | 0.198510E−01 | −0.150433E−02 | −0.237894E−03 | 0.269360E−04 |
| 6 | 0.3237 | −0.197666 | −0.110053 | 0.266192E−01 | −0.350469E−02 | 0.163593E−03 |

Figure 2:
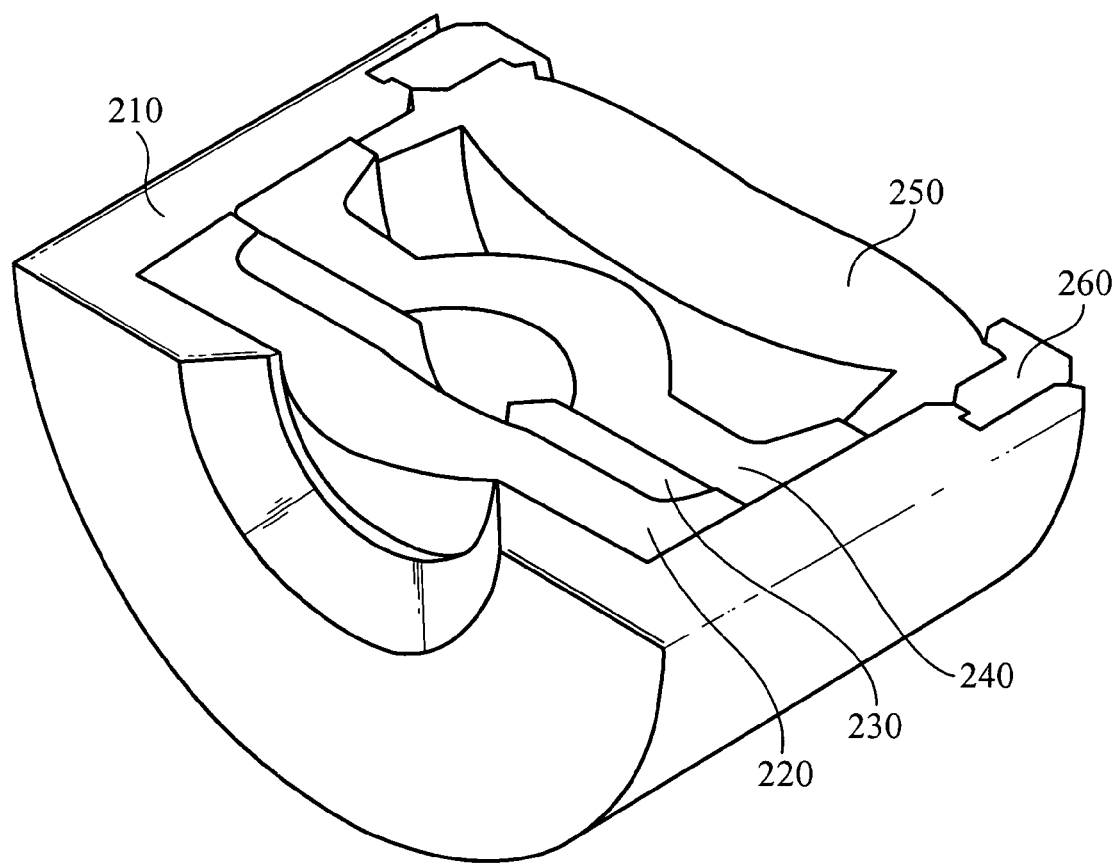
FIG. 2 shows a cross-section of an engineering drawing of a constructed lens system in accordance with the present invention.

FIG. 2 shows a cross-section of an engineering drawing of a constructed lens system 200. The components of the lens system are assembled within a barrel 210. Within the barrel 210, listed in order from the object side to the image side, are the first lens 220, the aperture stop 230, the second lens 240, and the third lens 250. The components of the lens system are held in place within the barrel 210 by a retaining ring 260.

Figure 3A:
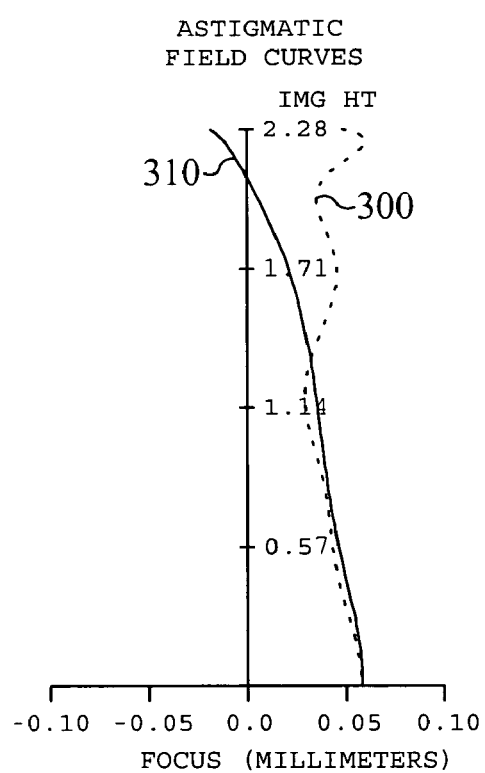
FIG. 3A shows a field curvature plot indicating the amount of astigmatism as a function of image height for the preferred embodiment of the present invention.
Figure 3B:
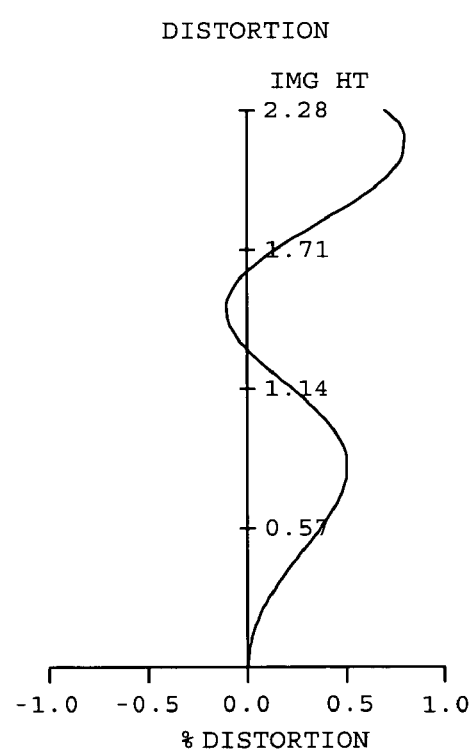
FIG. 3B shows a distortion plot indicating the percentage of optical distortion as a function of image height for the preferred embodiment of the present invention.

FIG. 3 shows two aberration plots for the preferred embodiment of the present invention. In particular, FIG. 3A shows a field curvature plot indicating the amount of astigmatism as a function of image height in a tangential direction 300 and a sagittal direction 310 in the image plane, and FIG. 3B shows a distortion plot indicating the percentage of optical distortion as a function of image height in the image plane 180.

Figure 4A:
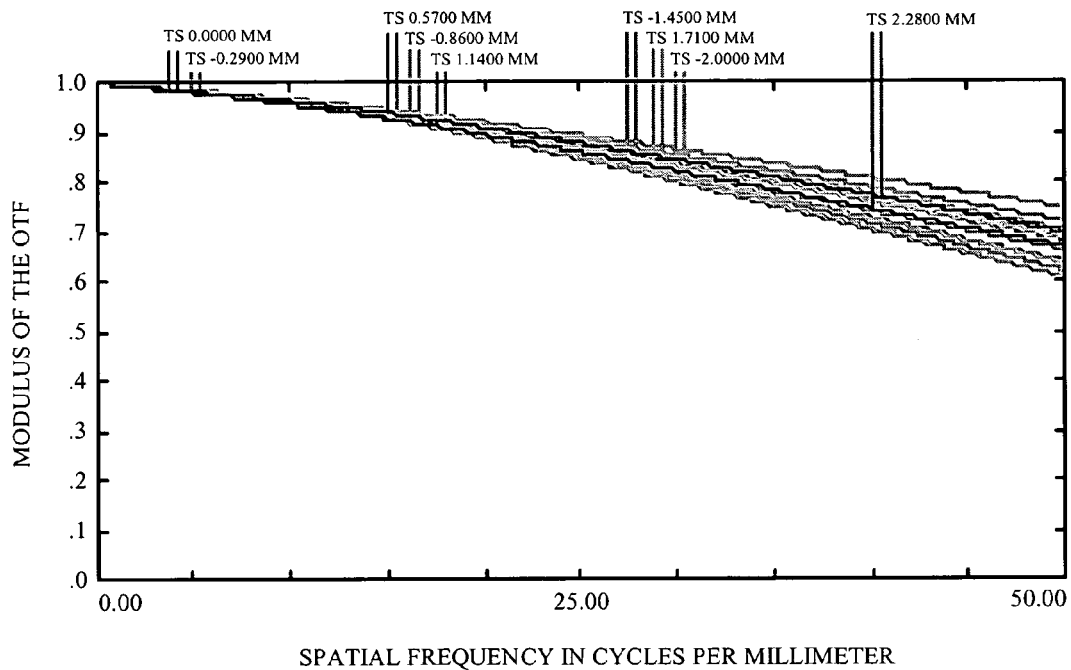
FIG. 4 shows three plots of the diffraction modulation transfer function for nominal design performance, $90^{th}$ percentile performance, and $98^{th}$ percentile performance for the preferred embodiment of the present invention.
Figure 4B:
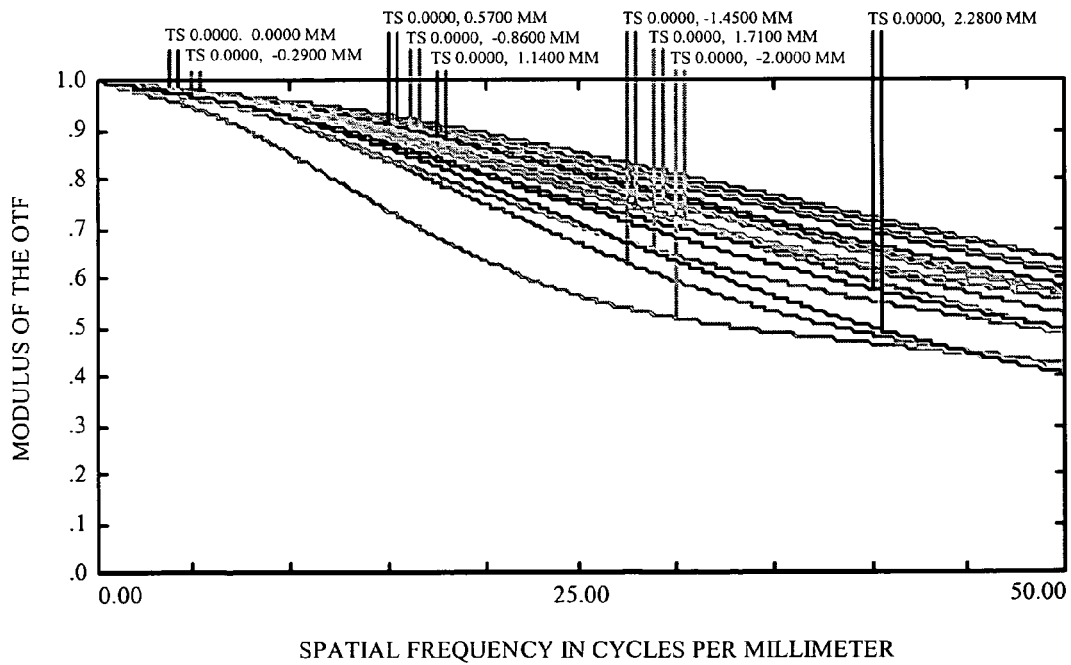
Figure 4C:
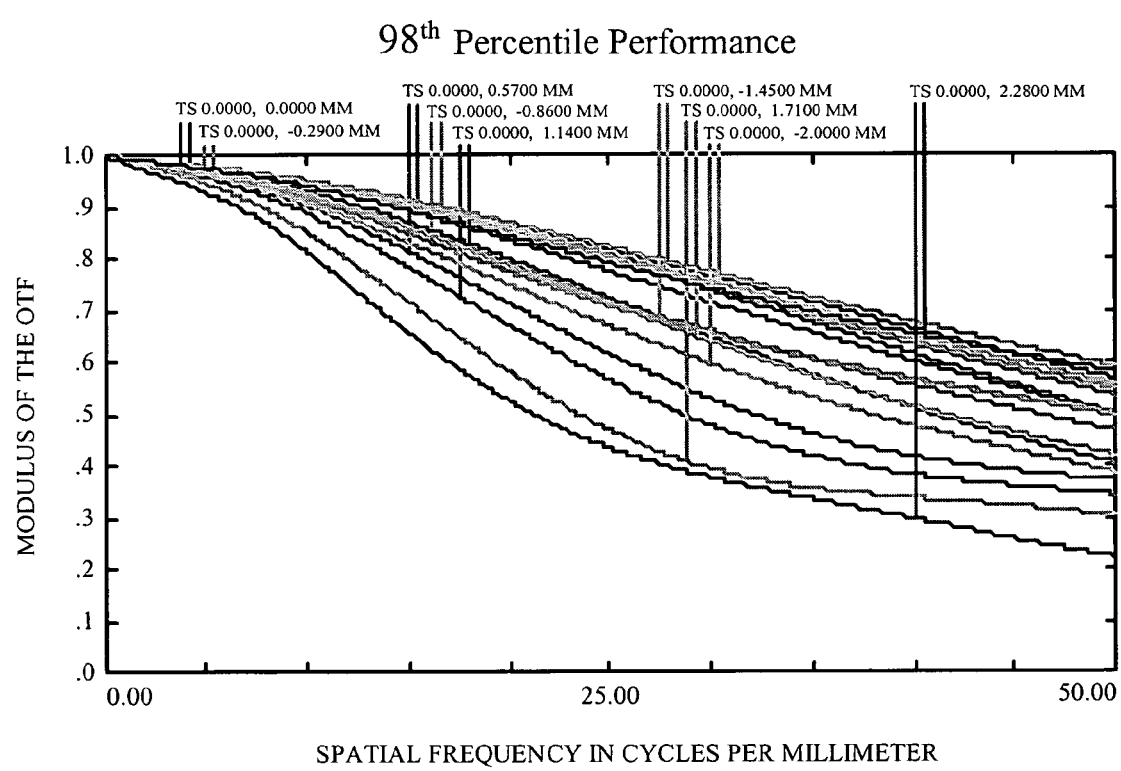

The prescription given above for the preferred embodiment of the present invention is particularly advantageous in that the lens system 100 has reduced sensitivity to manufacturing tolerances, particularly lateral misalignment of optical elements and surfaces. The three plots in FIG. 4 show the modulus of the OTF which is also known as the diffraction modulation transfer function (MTF). The diffraction MTF plot for nominal design performance is shown in FIG. 4A, and the MTF plots for $90^{th}$ and $98^{th}$ percentile performance of the system based on Monte Carlo statistical analyses are shown in FIGS. 4B and 4C, respectively. Higher MTF values correspond to a lens system with better overall performance because the contrast of fine image details is higher which is critical to the user of the lens system. Several pairs of curves are shown in each of the plots in FIG. 4 corresponding to different field positions as specified in the plots. One curve of each pair shows the MTF for the tangential direction (indicated by a line labeled T) and the other curve shows the MTF for the sagittal direction (indicated by a line labeled S). FIG. 4A shows the optimized nominal design performance. It is well within the system specifications of greater than 80% frequency response at a spatial frequency of 22.5 line pairs/mm and greater than 50% frequency response at a spatial frequency of 45 line pairs/mm. A Monte Carlo analysis of the three-lens system 100 taking into account manufacturing alignment errors and lens fabrication errors resulted in the performance plots shown in FIGS. 4B and 4C. Based on the results of the tolerancing statistics, FIG. 4B shows that more than 90% of the lens systems manufactured in a large production run will yield almost 60% frequency response at a spatial frequency of 22.5 lp/mm. FIG. 4C shows that more than 98% of the lens systems manufactured in a large production run will yield almost 50% frequency response at a spatial frequency of 22.5 lp/mm.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device of the present invention could be implemented in several different ways and have several different appearances.

What is claimed is:

1. A wide-field objective lens system comprising:
  a. first lens having a first aspheric surface and a second aspheric surface, wherein the first surface of the first lens is closest to an object to be imaged;
  b. a second lens having a first aspheric surface and a second aspheric surface, wherein the first surface of the second lens is adjacent to the second surface of the first lens;
  c. a third lens having a first aspheric surface and a second aspheric surface, wherein the first surface of the third lens is adjacent to the second surface of the second lens, and further wherein the second surface of the third lens is closest to an image plane of the object; and
  d. an aperture stop positioned between the first lens and the second lens, wherein a full angular field of view of the lens system is between 50 and 70 degrees, and further wherein a chief ray incident on an image plane has an incident angle less than 20 degrees.

2. The lens system as claimed in claim 1, wherein the digital image sensors have a diagonal between 2 mm and 10 mm.

3. The lens system as claimed in claim 1 wherein
  a. the first lens comprises a bi-aspheric positive meniscus wherein the first surface of the first lens is convex and the second surface of the first lens is concave;
  b. the second lens comprises a bi-aspheric negative meniscus wherein the first surface of the second lens is concave and the second surface of the second lens is convex; and
  c. the third lens comprises a bi-aspheric positive meniscus wherein the first surface of the third lens is convex and the second surface of the third lens is concave.

4. The lens system as claimed in claim 1, wherein the three lenses are made from plastic.

5. The lens system as claimed in claim 4, wherein at least one of the three lenses is made from a plastic different from the other two lenses.

6. The lens system as claimed in claim 4, wherein the first lens and the third lens are made from a first plastic, and the second lens is made from a second plastic.

7. The lens system as claimed in claim 1, wherein at least one surface of at least one of the three lenses is coated with a multilayer infrared cutoff filter.

8. The lens system as claimed in claim 6 wherein the first plastic has an index of refraction that is less than an index of refraction of the second plastic over a range of visible wavelengths.

9. A photographic lens system comprising:
a. a first lens having a first aspheric surface that is convex and a second aspheric surface, that is concave, wherein the first surface of the first lens is closest to an object to be imaged;
b. a second lens having a first aspheric surface that is concave and a second aspheric surface that is convex, wherein the first surface of the second lens is separated by a first air space from the second surface of the first lens; and
c. a third lens having a first aspheric surface that is convex and a second aspheric surface that is concave, wherein the first surface of the third lens is separated by a second air space from the second surface of the second lens, and further wherein the second surface of the third lens is closest to an image plane of the object,
wherein the lens system has a full angular field of view between 50 and 70 degrees and chief rays are incident on the image plane at an angle of less than 20 degrees.

10. The lens system as claimed in claim 9, wherein each of the lenses is made from plastic.

11. The lens system as claimed in claim 10, wherein at least one of the three lenses is made from a plastic different from the other two lenses.

12. The lens system as claimed in claim 10, wherein the first and third lenses are made from a first plastic, and further wherein the second lens is made from a second plastic.

13. The lens system as claimed in claim 12, wherein the first plastic has an index of refraction that is less than an index of refraction of the second plastic over a range of visible wavelengths.

14. The lens system as claimed in claim 9 wherein at least one of the surfaces of at least one of the lenses is coated with a multilayer infrared cut-off filter.

15. The lens system as claimed in claim 9, wherein
a. the first lens comprises a bi-aspheric positive meniscus;
b. the second lens comprises a bi-aspheric negative meniscus; and
c. the third lens comprises a bi-aspheric positive meniscus.

16. The lens system as claimed in claim 15 further comprising an aperture stop positioned between the first lens and the second lens.

17. The lens system as claimed in claim 9, wherein an aperture stop is located within the first air space.

* * * * *

UNITED STATES PATENT AND TRADEMARK OFFICE
CERTIFICATE OF CORRECTION

PATENT NO. : 7,477,461 B2
APPLICATION NO. : 11/644459
DATED : January 13, 2009
INVENTOR(S) : Bareau et al.

It is certified that error appears in the above-identified patent and that said Letters Patent is hereby corrected as shown below:

At column 3, line 59, please replace "11" with "111" and at column 3, line 61 please replace "1R" with "IR" so that the corresponding sentence reads -- At least one of the aspheric surfaces 111, 112, 121, 122, 131, or 132 of the three lenses 110, 120, and 130 is coated with an infrared (IR) cut-off filter. --

Signed and Sealed this

Seventeenth Day of March, 2009

JOHN DOLL
*Acting Director of the United States Patent and Trademark Office*